(12) United States Patent
Rickner et al.

(10) Patent No.: US 6,617,032 B2
(45) Date of Patent: Sep. 9, 2003

(54) POLYUREA-POLYURETHANE COMPOSITE STRUCTURE SUBSTANTIALLY FREE OF VOLATILE ORGANIC COMPOUNDS

(75) Inventors: Stephen Rickner, Irvine, CA (US); Joseph Jibrail, Mission Viejo, CA (US); Jose Camba, West Covina, CA (US); Carlos Velasco, Jr., Corona, CA (US); Calvin Peeler, Canton, MI (US); Michael May, Clawson, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/945,274

(22) Filed: Aug. 31, 2001

(65) Prior Publication Data

US 2003/0049458 A1 Mar. 13, 2003

(51) Int. Cl.$^7$ ................................. B32B 27/40
(52) U.S. Cl. ................ 428/423.3; 428/213; 428/297.4
(58) Field of Search .............................. 428/423.3, 213, 428/297.4

(56) References Cited

U.S. PATENT DOCUMENTS

| | | |
|---|---|---|
| 4,389,454 A | 6/1983 | Horacek et al. |
| 4,960,622 A * | 10/1990 | Jarboe et al. ............... 428/15 |
| 5,116,557 A | 5/1992 | Debaes et al. |
| 5,118,728 A | 6/1992 | Primeaux |
| 5,171,818 A | 12/1992 | Wilson |
| 5,215,796 A | 6/1993 | Mueller et al. |
| 5,543,225 A | 8/1996 | Mueller et al. |
| 5,595,701 A | 1/1997 | MacGregor et al. |
| 5,985,986 A | 11/1999 | Kubitza et al. |
| 6,026,760 A | 2/2000 | Phillips et al. |
| 6,092,343 A | 7/2000 | West et al. |

* cited by examiner

Primary Examiner—James J. Seidleck
Assistant Examiner—Melanie Bissett
(74) Attorney, Agent, or Firm—Fernando A. Borrego

(57) ABSTRACT

A composite structure including a polyurea show surface, or top layer, and a polyurethane backing layer is disclosed. Preferably, the show surface of the composite structure is substantially free of volatile organic compounds and is aliphatic such that it is ultraviolet light stable. Specifically, the show surface is the reaction product of an aliphatic polyisocyanate or aliphatic polyisocyanate blend, and of a resin component which is a polyamine. The resin component reacts with the aliphatic polyisocyanate to form a polyurea. The show surface has a Shore D hardness of 70. Like the show surface, the polyurethane backing layer of the composite structure is substantially free of volatile organic compounds. This backing layer is the reaction product of a second polyisocyanate component, such as polymeric diphenylmethane diisocyanate, and of a second-layer resin component, which comprises a polyol having a functionality of at least three. The complete composite structure has a flexural modulus of at least 200,000 lb/in$^2$.

44 Claims, No Drawings

POLYUREA-POLYURETHANE COMPOSITE STRUCTURE SUBSTANTIALLY FREE OF VOLATILE ORGANIC COMPOUNDS

FIELD OF THE INVENTION

The present invention relates generally to a polyurea—polyurethane composite structure that is substantially free from emission of volatile organic compounds (VOCs). The present invention more specifically relates to a composite structure having a flexural modulus of at least 200,000 lb/in$^2$ that is utilized in the boating, automobile, swimming pool, and bathtub industries and that includes an aliphatic first, or top, layer which is a show surface of the composite structure and is derived from polyisocyanate and a polyamine, and a second, or polyurethane-backing, layer derived from polyisocyanate and at least one polyol having a theoretical functionality of at least three. The first and second layers of the composite structure are both substantially free of VOCs.

BACKGROUND OF THE INVENTION

Use of composite structures throughout the boating, automobile, swimming pool, and bathtub industries is known in the art. Prior art composite structures typically include a first-layer of styrenated polyester. It is known in the art that, during application of the first-layer of styrenated polyester to a mold substrate, large quantities of styrene monomers, which are considered volatile organic compounds (VOCs), are emitted which is undesirable for environmental, health, and safety reasons. Furthermore, large quantities of other VOCs, such as methyl ethyl ketone, are also typically emitted during application and cross-linking of the styrenated polyester first-layers of the prior art. Emission of these other VOCs is also undesirable for environmental, health, and safety reason.

Furthermore, because the first-layer of the composite structure is a top layer or show surface of the composite structure, the composite structures of the prior art which include styrenated polyester as the first-layer, are excessively brittle and suffer from cracking and chipping defects due to this excessive brittleness characteristic of styrenated polyesters. Such defects become particularly apparent during shipping and handling, during transportation, and even during use of the composite structures. Finally, these and other composite structures of the prior art are deficient as their top layer or show surface is unstable over exposure to ultraviolet light.

Due to the inefficiencies identified in the composite structures of the prior art, it is desirable to provide a novel and durable composite structure having a top layer that does not emit VOCs during application to the mold substrate and that utilizes aliphatic components such that the top layer, or show surface, of the composite structure is stable under exposure to ultraviolet light.

SUMMARY OF THE INVENTION

According to the present invention, a composite structure is provided. The composite structure has a flexural modulus of at least 200,000 lb/in$^2$ such that the composite structure is tailored for use in the particular industries in which the subject invention is utilized. The composite structure includes a first-layer (A) and a second-layer (B). As understood by those skilled in the art, the first-layer is a top layer or show surface of the completed composite structure, and the second-layer is a backing layer that functions to provide support and durability to the completed composite structure.

The first-layer (A) of the composite structure is substantially free of volatile organic compounds (VOCs). As such, during application of the first-layer (A) to a mold substrate, the first-layer does not emit VOCs into the surrounding environment. Furthermore, the first-layer (A) includes aliphatic components which are ultraviolet light stable. More specifically, the first-layer (A) of the subject invention is the reaction product of a first-layer polyisocyanate component (A)(I) that includes an aliphatic polyisocyanate, and a first-layer resin component (A)(II) including a polyamine. The polyamine of the first-layer resin component (A)(II) reacts with the first-layer polyisocyanate component (A)(I) to form a polyurea first-layer. Generally, the hardness of the first-layer (A) is an important attribute throughout particular industries. The first-layer (A) is designed to have a Shore D hardness of at least 65 which is suitable for balancing durability properties of the composite structure and prevention of chipping and cracking defects like those observed in the prior art.

Like the first-layer (A), the second, or backing layer (B) of the composite structure of the subject invention is substantially free of VOCs and therefore does not emit VOCs into the surrounding environment. The second-layer (B) is the reaction product of a second-layer polyisocyanate component (B)(I) and a second-layer resin component (B)(II). The second-layer resin component (B)(II) more specifically includes at least one polyol having a theoretical functionality of at least three. In particular, there is a plurality of polyols including a first polyether polyol that is made from an initiator compound having at least three functional groups. This first polyether polyol further includes a hydroxyl number of 200 meq polyol/g KOH or more and a viscosity of 5,000 centipoise or less at 25° C. These physical properties of the first polyether polyol contribute to a second-layer (B) that provides substantial support and durability to the completed composite structure.

DETAILED DESCRIPTION OF A PREFERRED EMBODIMENT

A composite structure is disclosed. The composite structure of the subject invention includes a first-layer (A) and a second-layer (B). The first (A) and second (B) layers are applied to a mold substrate in an open-mold process to form the composite structure. In the open-mold process, the first-layer (A) is first applied to a surface of the mold substrate, and then the second-layer (B) is applied after the first-layer (A) without the mold substrate having to close on itself to form the composite structure. The first (A) and second (B) layers are then de-molded from the open-mold substrate.

After application of the first (A) and second (B) layers and after the de-molding of the completed composite structure, the first-layer (A) is a top layer or show surface of the composite structure whereas the second-layer (B) is a backing layer to the first-layer (A). Both the first (A) and second (B) layers of the subject invention are substantially free of volatile organic compounds (VOCs).

According to the subject invention, it is to be generally understood that substantially free of VOCs is intended to indicate that, during the production of the first (A) and second (B) layers, no significant amount, and preferably no amount, of volatile chemical compounds are emitted by the components producing such layers or the reaction mixtures thereof, where volatile chemical compounds are defined by those that contains the element carbon, excluding certain exempted compounds such as methane, carbon monoxide, carbon dioxide, carbonic acid, metallic carbides and carbonates, ammonium carbonate, and other exempt compounds. This is particularly relevant when the subject invention is compared to VOCs emitted by processes which utilize styrenated polyester compounds as reactants for the layers. This definitional standard is found under South Coast Air Quality Management District's (SCAQMD) Regulation I, Rule 102, entitled "Definition Of Terms" adopted Feb. 4, 1977 and last amended Apr. 9, 1999, and under SCAQMD's Regulation XI, Rule 1162, entitled "Polyester Resin Operations" adopted Mar. 6, 1987 and last amended Nov. 17, 2000. Under the Rule 1162 definitional standard, other exempt compounds include, but are not limited to, Group I Exempt Compounds, specifically chlorodifluoromethane (HCFC-22), dichlorotrifluoroethane (HCFC-123), tetrafluoroethane (HFC-134a), dichlorofluoroethane (HCFC-141b), chlorodifluoroethane (HCFC-142b), trifluoromethane (HFC-23), 2-chloro-1,1,1,2-tetrafluoroethane (HCFC-124), pentafluoroethane (HFC-125), 1,1,2,2-tetrafluoroethane (HFC-134), 1,1,1-trifluoroethane (HFC-143a), 1,1-difluoroethane (HFC-152a), cyclic branched, or linear, completely fluorinated alkanes, cyclic, branched, or linear, completely fluorinated ethers with no unsaturations, cyclic, branched, or linear, completely fluorinated tertiary amines with no unsaturations, and sulfur-containing perfluorocarbons with no unsaturations and with sulfur bonds only to carbon and fluorine, and Group II Exempt Compounds, specifically methylene chloride, carbon tetrachloride, 1,1,1-trichloroethane (methyl chloroform), trichlorotrifluoroethane (CFC-113), dichlorodifluoromethane (CFC-12), trichlorofluoromethane (CFC-11), dichlorotetrafluoroethane (CFC-114), chloropentafluoroethane (CFC-115).

SCAQMD's definition for VOCs is but one definitional standard that is currently observed by some counties in California. It is to be understood that the remaining counties in California, other states, and other jurisdictions may observe other definitional standards for defining a VOC and acceptable levels of VOCs. For instance, another definitional standard defining a VOC, which is arguably most likely to be observed, is found in 40 CFR Part 59, Section 59.401, entitled "Definitions" and specifically sets forth that a VOC is any organic compound that participates in atmospheric photochemical reactions and is not exempted for having negligible photochemical reactivity. Compounds considered to have negligible photochemical reactivity, which are also referred to as exempt compounds, can be found in 40 CFR Part 59, Section 51.100(s). Generally, one skilled in the art will appreciate and know the meaning of substantially free of VOCs.

The first-layer (A) is the reaction product of a first-layer polyisocyanate component (A)(I) and a first-layer resin component (A)(II). The first-layer resin component (A)(II) will be discussed in detail below. Depending on the embodiment, the first-layer polyisocyanate component (A)(I) of the subject invention preferably includes an aliphatic polyisocyanate. In other words, the first-layer polyisocyanate component (A)(I) may also include aromatic polyisocyanates. For instance, in composite structures where UV stability is not critical, or in composite structures where UV stability is critical but dark pigment additives, such as carbon black pigment, are utilized, then aliphatic polyisocyanates are not required to achieve adequate UV stability. On the other hand, in composite structures where UV stability is critical, especially when light pigment additives, such as $TiO_2$ pigment, are utilized, then aliphatic polyisocyanates are necessary for UV stability and are therefore preferred. Suitable polyisocyanates for the first-layer polyisocyanate component (A)(I), both aromatic and aliphatic, are described below in significant detail in terms of the second-layer (B). Whenever the term aliphatic is used throughout the subject application, it is intended to indicate both aliphatic and alicyclic. That is, aliphatic indicates both straight-chain arrangement of carbon atoms (non-cyclic) as well as arrangements of carbon atoms in closed ring structures (cyclic) so long as these arrangements are not aromatic.

Suitable aliphatic polyisocyanates of the first-layer polyisocyanate component (A)(I) include isocyanates selected from the group consisting of hexamethylene diisocyanate (HDI), isophorone diisocyanate (IPDI), and mixtures thereof. In a preferred embodiment of the subject invention, the aliphatic polyisocyanate of the first-layer polyisocyanate component (A)(I) is a blend of HDI and IPDI at a weight ratio of approximately 1:5, respectively. Other aliphatic polyisocyanates that may be utilized in the first-layer polyisocyanate component include, but are not limited to, dicyclohexane-4,4' diisocyanate (Desmodur W), hexamethylene diisocyanate trimer (HDI Trimer), isophorone diisocyanate trimer (IPDI Trimer), hexamethylene diisocyanate biuret (HDI Biuret), cyclohexane diisocyanate, meta-tetramethylxylene diisocyanate (TMXDI), and mixtures thereof. Additionally, it is to be understood that the first-layer polyisocyanate component may be a pre-polymer. That is, the first-layer polyisocyanate component may be a polymeric IPDI initiated pre-polymer including IPDI and a stoichiometrically insufficient amount of the first-layer resin component (A)(II) or other polyamine and polyol resin components. The first-layer polyisocyanate component (A)(I) may also include an aromatic polyisocyanate. In such cases, it may be necessary to supplement the first-layer (A) with at least one UV performance enhancing additive such that the first-layer which is the show surface of the composite structure is stable under exposure to ultraviolet light. Suitable UV performance enhancing additives are described below.

As identified above, the first-layer (A) also incorporates the first-layer resin component (A)(II). The first-layer resin component (A)(II) includes a compound that reacts, or cross-links, with the first-layer polyisocyanate component (A)(I) to form the first-layer (A). This compound comprises a polyamine. As such, the first-layer (A) includes a polyurea. The polyamine can be an aromatic or aliphatic polyamine, or mixtures thereof. The polyamine can also be a polyether or polyester polyamine. Preferably, the polyamine is an aliphatic polyamine, most preferably an aliphatic polyether polyamine. It is to be understood that the first-layer resin component (A)(II) can optionally include some amounts of polyols. If the first-layer resin component (A)(II) does include some polyols, suitable polyols for the first-layer resin component (A)(II) are described below in significant detail in terms of the second-layer (B).

If the aliphatic polyamine is selected as the compound to react with the first-layer polyisocyanate component (A)(I), such as IPDI, then the first-layer (A) is the aliphatic polyurea. The aliphatic polyamine (A)(II) is selected from the group consisting of polyoxyalkylene amines, polyoxyalkylene diamines, and polyoxyalkylene triamines. Preferably, the aliphatic polyamine is polyoxypropylene diamine. In this preferred embodiment, the polyoxypropylene diamine reacts with the IPDI to form the aliphatic polyurea as the first-layer (A).

In addition to the first-layer polyisocyanate component (A)(I) and a first-layer resin component (A)(II), the first-layer (A) may also include one or more additives directed at enhancing the performance of one or more physical properties of the first-layer (A). For instance, the additive or additives may be selected from the group consisting of surfactants, flame retardants, fillers, dyes, water scavengers, anti-foam agents, catalysts, UV performance enhancers, pigments, hindered amine light stabilizers, and mixtures thereof. Other suitable additives include, but are not limited to, cell regulators, hydrolysis-protection agents, fungistatic and bacteriostatic substances, dispersing agents, adhesion promoters, and appearance enhancing agents. Although the subject invention is not intended to be limited to these examples, some specific examples of these additives include, in no particular order, aluminum tri-hydrate, calcium carbonate, gypsum, wollastonite, phosphorus, silica, glass including glass beads, calcium sulfate, and magnesium hydroxide.

The catalysts which may be employed as an additive greatly accelerate the reaction between the first-layer polyisocyanate component (A)(I) and the first-layer resin component (A)(II). Examples of suitable catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X—R^1-y]_2$, wherein R is a $C_1$–$C_8$ alkyl or aryl group, $R^1$ is a $C_0$–$C_{18}$ methylene group optionally substituted or branched with a $C_1$–$C_4$ alkyl group, Y is hydrogen or a hydroxyl group, preferably hydrogen, X is methylene, an —S—, an —$SR^2COO$—, —SOOC—, an —$O_3S$—, or an —OOC— group wherein $R^2$ is a $C_1$–$C_4$ alkyl, n is 0 or 2, provided that $R^1$ is $C_0$ only when X is a methylene group.

Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl-tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl-tin dimercaptides.

More specific examples of surfactants are salts of sulfonic acids, e.g., alkali metal salts or ammonium salts of dodecylbenzene- or dinaphthylmethanedisulfonic acid and ricinoleic acid. Other preferred surfactants include silicone-containing surfactant polymers. The surfactants are usually used in amounts of 0.01 to 5 parts by weight, based on 100 parts by weight of the first-layer resin component (A)(II). More specific examples of anti-foam agents include siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil. Specific examples of cell regulators include paraffins, fatty alcohols, and dimethylpolysiloxanes.

For the purposes of the subject invention, other fillers include conventional organic and inorganic fillers and reinforcing agents. More specific examples include inorganic fillers, such as silicate minerals, for example, phyllosilicates such as antigorite, serpentine, hornblends, amphiboles, chrysotile, and talc; metal oxides, such as aluminum oxides, titanium oxides and iron oxides; metal salts, such as chalk, barite and inorganic pigments, such as cadmium sulfide, zinc sulfide and glass, inter alia; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into first-layer resin component (A)(II) or into the first-layer polyisocyanate component (A)(I) in amounts from 0.5 to 40 percent by weight, based on the weight of components (the first-layer resin component (A)(II) and the first-layer polyisocyanate component (A)(I)).

Examples of suitable flame retardants are tricresyl phosphate, tris(2-chloroethyl) phosphate, tris(2-chloropropyl) phosphate, and tris(2,3-dibromopropyl) phosphate. A suitable flame retardant in compositions of the present invention comprises FYROL PCF, which is a tris (chloro propyl)phosphate commercially available from Albright & Wilson.

In addition to the above-mentioned halogen-substituted phosphates, it is also possible to use inorganic or organic flame retardants, such as red phosphorus, aluminum oxide hydrate, antimony trioxide, arsenic oxide, ammonium polyphosphate (EXOLIT) and calcium sulfate, expandable graphite or cyanuric acid derivatives, e.g., melamine, or mixtures of two or more flame retardants, e.g., ammonium polyphosphates and melamine, and, if desired, corn starch, or ammonium polyphosphate, melamine, and expandable graphite and/or, if desired, aromatic polyesters, in order to flameproof the first-layer (A).

It is understood in the art that UV performance enhancers, or UV light stabilizers, are sometimes necessary to prevent the breakdown and loss of chemical and physical properties in the composite structure due to UV light. The preferred UV performance enhancers used in the first-layer (A) of the subject invention include Tinuvin 1130 and Tinuvin 292 commercially available from Ciba. Of course, any other UV performance enhancers available from Ciba or other equivalent suppliers include, but are not limited to, Tinuvin 123 and Tinuvin 900.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983; incorporated herein by reference.

Upon application of the first-layer polyisocyanate component (A)(I) and the first-layer resin component (A)(II) to the mold substrate, the volume ratio of the first-layer polyisocyanate component (A)(I) to the first-layer resin component (A)(II) is from 1:3 to 3:1. More preferably, the volume ratio is 1:1. The thickness of the first-layer (A) in the completed composite structure can vary from 1 to 500 mils. Most preferably, the thickness is from 6 to 36 mils. Furthermore, to balance required physical properties including, but not limited to, rigidity, impact strength, flexural modulus, and heat distortion, the first-layer is designed to have a Shore D hardness of at least 65. Preferably, the Shore D hardness of the first-layer is at least 80, and most preferably ranging from 80 to 90. A suitable first-layer (A) is Polyeuro A380 Polyurea System from Polycoat Products Corporation, California.

The second-layer (B) of the composite structure is a polyurethane that is the reaction product of a second-layer polyisocyanate component (B)(I) and a second-layer resin component (B)(II). The second-layer resin component (B) (II) is described in detail below. In the preferred embodiment of the subject invention, the second-layer polyisocyanate component (B)(I) is further defined as polymeric diphenylmethane diisocyanate (PMDI). As with the first-layer polyisocyanate component (A)(I), the second-layer polyisocyanate component (B)(I) may be a pre-polymer. That is, the second-layer polyisocyanate component (B)(I) may be a PMDI initiated pre-polymer including PMDI in a stoichiometrically excess amount and a polyol resin component. This polyol resin component may be the same as the second layer resin component.

Other suitable organic polyisocyanates, defined as having 2 or more isocyanate functionalities, include, but are not limited to, conventional aliphatic, cycloaliphatic, araliphatic and aromatic isocyanates other than PMDI. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate, 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures and aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDI), as well as mixtures of crude MDI and toluene diisocyanates. The organic di- and polyisocyanates can be used individually or in the form of mixtures.

Additionally, so-called modified multivalent isocyanates, i.e., products obtained by the partial chemical reaction of organic diisocyanates and/or polyisocyanates may be used. Examples include diisocyanates and/or polyisocyanates containing ester groups, urea groups, biuret groups, allophanate groups, carbodiimide groups, isocyanurate groups, and/or urethane groups. More specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The organic isocyanates used in the invention preferably have an average functionality of greater than 2, most preferably 2.5 or more. This provides for a greater crosslinking density, which improves the overall dimensional stability of the composite structure.

To produce the second-layer (B) of the subject invention, the second-layer polyisocyanate component (B)(1) and the isocyanate reactive compounds, i.e., the second-layer resin component (B)(II), are reacted in such amounts that the isocyanate index, defined as the number of equivalents of NCO groups divided by the total number of isocyanate reactive hydrogen atom equivalents multiplied by 100, ranges from about 80 to less than about 150, preferably from about 90 to 110. If the second-layer (B) contains, at least in part, bonded isocyanurate groups, an isocyanate index of 150 to 6000, preferably from 200 to 800, is preferred.

The second-layer resin component (B)(II) of the second-layer (B) includes at least one polyol having a theoretical functionality of at least three. By theoretical functionality, it is meant that the functionality expected is based upon the functionality of the initiator molecule, rather than the actual functionality of the at least one polyol after manufacture. The at least one polyol may be either a polyether polyol or a polyester polyol. The at least one polyol is present in the second-layer resin component (B)(II) in an amount from 20 to 60, more preferably from 30 to 50, parts by weight based on 100 parts by weight of the second-layer resin component (B)(II). The at least one polyol includes an initiator compound having at least three functional groups. As is known in the art, suitable initiators for polyols primarily include low molecular weight di- and polyfunctional alcohols or polyamines. As such, the initiator compound of the subject invention is preferably selected from the group consisting of glycerin, methyl glucoside, pentaerythritol, sorbitol, sucrose, toluenediamine, ethylenediamine, and mixtures thereof. Of course, other suitable initiator compounds for the at least one polyol include, but are not limited to, trimethylolpropane, propylene glycol, dipropylene glycol, and 2,2-bis(4-hydroxyphenyl)-propane, and mixtures thereof.

Preferably, the second-layer resin component (B)(II) includes a plurality of polyols. In this preferred embodiment, the plurality is present in an amount from 20 to 60, more preferably from 30 to 50, parts by weight based on 100 parts by weight of the second-layer resin component (B)(II). The plurality of polyols includes, at least, a first polyether polyol which will be described in detail immediately below. However, it is to be understood that, in addition to the first polyether polyol, the plurality of polyols may also include polyester polyols. The first polyether polyol is present in the second-layer resin component (B)(II) in an amount from 10 to 30 parts by weight based on 100 parts by weight of the second-layer resin component (B)(II). The first polyether polyol has a hydroxyl number of 200 meq polyol/g KOH or more and a viscosity of 5,000 centipoise or less at 25° C. More preferably, the hydroxyl number of the first polyether polyol is from 225 to 295 meq polyol/g KOH, and the viscosity is from 2000 to 3200 centipoise at 25° C. Further, the average molecular weight of the sucrose-glycerin co-initiated polyether polyol is from 500 to 5,000.

Suitable polyols for the second-layer resin component (B)(II) include, but are not limited to, all phthalic anhydride-initiated polyester polyols, aromatic amine-initiated polyols, aliphatic amine-initiated polyols, polyoxyalkylene polyether polyols, polythioether polyols, polyester amides and polyacetals containing hydroxyl groups, aliphatic polycarbonates containing hydroxyl groups, amine terminated polyoxyalkylene polyethers, polyester polyols, other polyoxyalkylene polyether polyols, and graft dispersion polyols, and mixtures thereof.

Included among the polyoxyalkylene polyether polyols are polyoxyethylene polyols, polyoxypropylene polyols, polyoxybutylene polyols, polytetramethylene polyols, and block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology,* Vol. 7, pp. 257–262, published by Interscience Publishers, Inc. (1951) or in U.S. Pat. No. 1,922,459, both incorporated herein by reference. The alkylene oxides may be added to the initiator compound, individually, sequentially one after the other to form blocks, or in mixture to form a heteric polyether. The polyoxyalkylene polyether polyols may have either primary or secondary hydroxyl groups.

The polyoxyalkylene polyether polyols may be aromatic amine-initiated or aliphatic amine-initiated polyoxyalkylene polyether polyols. It is preferred that at least one of the amine-initiated polyols is polyether polyol terminated with a secondary hydroxyl group through addition of, for example, propylene oxide as the terminal block. It is preferred that the amine-initiated polyols contain 50 weight percent or more, and up to 100 weight percent, of secondary hydroxyl group forming alkylene oxides, such as polyoxypropylene groups, based on the weight of all oxyalkylene groups. This amount can be achieved by adding 50 weight percent or more of the secondary hydroxyl group forming alkylene oxides to the initiator molecule in the course of manufacturing the polyol.

As discussed above suitable initiator compounds for the polyol include primary or secondary amines. These would include, for the aromatic amine-initiated polyether polyol, the aromatic amines such as aniline, N-alkylphenylene-diamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes, with preference given to vicinal toluene diamines.

For the aliphatic amine-initiated polyol, any aliphatic amine, whether branched or unbranched, substituted or unsubstituted, saturated or unsaturated, may be used. These would include, as examples, mono-, di-, and trialkanolamines, such as monoethanolamine, methylamine, triisopropanolamine; and polyamines such as ethylene diamine, propylene diamine, diethylenetriamine; or 1,3-diaminopropane, 1,3-diaminobutane, and 1,4-diaminobutane. Preferable aliphatic amines include any of the diamines and triamines, most preferably, the diamines.

The polyoxyalkylene polyether polyols may generally be prepared by polymerizing alkylene oxides with polyhydric amines. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

The preferred polyols for the plurality are initiated with polyhydroxyl compounds having at least 4 sites reactive with alkylene oxides, and further may be oxyalkylated solely with propylene oxide.

Also suitable are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graft polyols may be found in columns 1–5 and in the Examples of U.S. Pat. No. 3,652,639; in columns 1–6 and in the Examples of U.S. Pat. No. 3,823,201; in columns 2–8 and in the Examples of U.S. Pat. No. 4,690,956: and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 mm, preferably less than 10 mm.

Other than the at least one polyol, which has already been specifically described above, the other polyols in the second-layer resin component (B)(II), as for example those listed above, preferably have an average hydroxyl number of 200 or more meq polyol/g KOH. The optimum nominal functionality of aromatic polyester polyols is 2 or more, with average hydroxyl numbers of 350 or more. Likewise, the optimum nominal functionality of each amine-initiated polyol is 4 or more, with average hydroxyl numbers of 400 or more. Individual polyols within the plurality may be used which fall below the above average hydroxyl numbers, but the average should be within this range.

The initiator compound in the most preferred embodiment for the first polyether polyol is made from an initiator mixture of sucrose and glycerin. In this embodiment, there is a high amount of sucrose and a minimal amount of glycerin such that the sucrose/glycerin mixture has an average functionality of 7. The sucrose/glycerin mixture of the initiator compound is reacted to from a sucrose-glycerin co-initiated polyether polyol. A suitable sucrose-glycerin co-initiated polyether polyol is commercially available as Tri-iso Polyol G-26 from Tri-iso, Inc., California.

In addition to the at least one polyol, the second-layer resin component (B)(II) may further include a supplemental cross-linking agent, i.e., a chain extending agent, selected from the group consisting of diols. More specifically, the diols include any aliphatic, cycloaliphatic and/or araliphatic diol having from 2 to 14 carbon atoms, preferably from 4 to 10 carbon atoms. The supplemental cross-linking agent helps achieve the desired mechanical hardness and dimensional stability in the second-layer (B) and therefore in the overall composite structure. In addition to diols, the supplemental cross-linking agent can also include dialkylene glycols. Preferably, the diol selected is diethylene glycol (DEG). Alternative supplemental cross-linking agents include, but are not limited to, ethylene glycol, propylene glycol, 1,4-butanediol, 1,6-hexanediol, 1,3-propanediol, 1,10-decanediol, o-, in-, and p-dihydroxycyclohexane, diethylene glycol, dipropylene glycol, bis(2-hydroxyethyl) hydroquinone, and even triols such as 1,2,4- and 1,3,5-trihydroxycyclohexane, glycerol, and trimethylolpropane, and mixtures thereof. The supplemental cross-linking agent typically has a number average molecular weight of less than 400, preferably from 60 to 300 and is present in the second-layer resin component (B)(II) in an amount from 10 to 30 parts by weight based on 100 parts by weight of the second-layer resin component (B)(II). The polyurethane second-layer (B) can also be prepared by using secondary aromatic diamines, primary aromatic diamines, 3,3'-di- and/or 3,3'-, 5,5'-tetraalkyl-substituted diaminodiphenyl-methanes as the supplemental cross-linking agent instead of or mixed with the above-mentioned diols and/or triols.

The second-layer resin component (B)(II) also optionally includes propylene carbonate. If utilized in the subject invention, the propylene carbonate functions as a reactive diluent to broaden the 'workability' window of the subject invention by minimizing the viscosity of the second-layer resin component (B)(II), and ultimately of the second-layer (B), and also by enabling the composite structure to cure, i.e., react, on the mold substrate at lower temperatures without the need for supplemental heat and/or supplemental catalyst. The propylene carbonate, if utilized, is present in the second-layer resin component (B)(II) in an amount from 1 to 15 parts by weight based on 100 parts by weight of the second-layer resin component (B)(II).

As with the first-layer resin component (A)(II), the second-layer resin component (B)(II) may also include one or more additives directed at enhancing the performance of one or more physical properties of the first-layer (A). For instance, the additive or additives may be selected from the group consisting of surfactants, flame retardants, fillers, dyes, water scavengers, anti-foam agents, catalysts, UV performance enhancers, pigments, hindered amine light stabilizers, and mixtures thereof. The additives available for use in the second-layer (B) are the same as those additives described above in terms of the first-layer (A). Additionally, the second-layer resin component (B)(II) can include a dye, that, along with the second-layer resin component (B)(II), mixes with the second-layer polyisocyanate component (B)(I) to indicate thorough mixing between the second-layer polyisocyanate component (B)(I) and the second-layer resin component (B)(II). In the preferred embodiment, this dye is a blue dye that mixes with the second-layer polyisocyanate component (B)(I), which is partially yellow, to form a second layer (B) that, if green, indicates thorough mixing between the second-layer polyisocyanate component (B)(I) and the second-layer resin component (B)(II). Of course, other suitable colors can be selected for this dye.

As for catalysis of the reaction between the second-layer polyisocyanate component (A)(I) and the second-layer resin component (A)(II), in addition to the catalysts already identified above, tertiary amines also promote urethane linkage formation. These amines include triethylamine, 3-methoxypropyldimethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl4-dimethylaminoethyl-piperazine, 1,2-dimethylimidazole, 1-azabicylo[3.3.0]octane and preferably 1,4-diazabicylol[2.2.2]octane, and alkanolamine compounds, such as triethanolamine, triisopropanolamine, N-methyl- and N-ethyldiethanolamine and dimethylethanolamine.

The second-layer polyisocyanate component (B)(I) and the second-layer resin component (B)(II) are applied to the mold substrate after the first coat (A) is applied. During application of the second-layer (B), the volume ratio of the second-layer polyisocyanate component (B)(I) to the second-layer resin component (B)(II) is from 1:3 to 3:1. More preferably, the volume ratio is 1:1. The thickness of the second-layer (B) in the completed composite structure can vary from 1 to 2000 mils. Most preferably, the thickness is from 100 to 400 mils. Furthermore, to balance required physical properties including, but not limited to, rigidity, impact strength, flexural modulus, and overall durability and support of the first-layer (A), the second-layer (B) is designed to further include chopped fibers as is known in the art to enhance structural integrity. These chopped fibers include, but are not limited to, chopped fiberglass, chopped carbon fibers, chopped wood fibers, chopped aramid fibers including all aromatic polyamide materials, chopped polymer fibers such as nylon, and mixtures thereof. Preferably, the chopped fiber is chopped fiberglass that is present in the second-layer (B) in an amount from 1 to 50, more preferably from 15 to 35, parts by weight based on 100 parts by weight of the second-layer (B). Certain embodiments of the subject invention may include a plurality, i.e., more than one, second layer (B). In these embodiments, the chopped fibers can be flattened by rolling prior to application of a subsequent second layer (B).

The composite structure of the preferred embodiment also includes a barrier-layer (C) in addition to the first (A) and second (B) layers. The barrier-layer (C) is disposed between the first (A) and second (B) layers to optimize gel times as well as the cross-linking rates between the first (A) and second (B) layers. As such, any 'peel' realized in the first-layer (A) is minimized. To serve these purposes, the barrier-layer (C) is the reaction product of a barrier-layer polyisocyanate component, and a barrier-layer resin component. Most preferably, the barrier-layer resin component is a blend of at least a trimethylol propane initiated polyether polyol having a hydroxyl number of 30 meq polyol/g KOH or more and an average functionality of from 2 to 3, and a vicinal toluenediamine-initiated polyether polyol having a hydroxyl number of 300 meq polyol/g KOH or more and an average functionality of from 3.5 to 4.5. The thickness of the barrier-layer (C) in the completed composite structure can vary from 1 to 1000 mils.

The completed composite structure of the subject invention exhibits a flexural modulus of at least 200,000 lb/in$^2$. More preferably, the flexural modulus is at least 250,000 lb/in$^2$. It is known in the art that flexural modulus is a mechanical method for defining the stiffness of a composite structure under flexing. In the subject invention, the preferred method for determining the flexural modulus of the composite structure is ASTM Test Method D 790 which is a three-point bend test that applies a load to a specimen, such as a ⅛ by ½ by 4 inch specimen, of the composite structure as the composite structure is supported at each end. The completed composite structure of the subject invention is also designed to achieve an impact resistance of from 0.5 to 6 ft-lb/in, preferably from 1.0 to 3.0 ft-lb/in, notched izod as measured according to ASTM Test Method D 256.

The following examples, illustrating the formation of the first-layer (A), the second-layer (B), the barrier-layer (C), and the complete composite structure, as presented herein, are intended to illustrate and not limit the invention.

EXAMPLES

The first-layer (A) composition of the composite structure is prepared by adding and reacting the following parts, by weight, unless otherwise indicated.

| First-layer (A) Reactant | Amount (parts by weight) |
|---|---|
| First-layer Resin Component (A)(II) | |
| POLYAMINE A | 40.3 |
| Polyaspartic Ester | |
| (Desmophen NH 1220) | |
| ISOPHORNE DIAMINE | 2.0 |
| DISPERPLAST 1142 | 0.4 |
| CLEARLINK 1000 | 20.0 |
| FILLER A | 18.0 |
| [Talc] MP-1250 | |
| FILLER B | 0.5 |
| [Aerosil 972] | |
| UV ABSORBER | 0.3 |
| [Tinuvin 1130] | |
| UV PERFORMANCE ENHANCER | 0.6 |
| (hindered amine light stabilizer) | |
| [Tinuvin 292] | |
| CATALYST A | 0.06 |
| [Catalyst 315] | |
| CATALYST B | 0.06 |
| [Dabco 33 LV] | |
| CATALYST C | 0.03 |
| [Formez SUL-4] | |
| PIGMENT A | 15.0 |
| [DuPont R-960 $TiO_2$ Pigment] | |
| Moisture Scavenger | 2.0 |
| [Unisiv 3A powder] | |
| Defoamer | 0.02 |
| [Sag 47] | |
| Deareator | 0.4 |
| [Byk 361] | |
| Adhesion Promoter | 0.4 |
| [Silaquest A-187] | |
| First layer Polyisocyanate Component (A)(I) | |
| ISOCYANATE A | 13 |
| [IPDI] | |
| Polyol | 19.5 |
| [1000 MW propylene polyether polyol] | |
| DINP | 5.4 |
| CATALYST | 0.05 |
| [Formez SUL-4] | |
| N-3300 | 62.0 |

The second-layer (B) composition of the composite structure is prepared by adding and reacting the following parts, by weight, unless otherwise indicated.

| Second-layer (B) Reactant | Amount (parts by weight) |
|---|---|
| Second-layer Resin Component (B)(II) | |
| POLYOL A | 22.50 |
| [a trimethylolpropane initiated polyether polyol having a hydroxyl number of about 35, and an average functionality of about 2.5] | |
| POLYOL B | 17.00 |
| [a sucrose - glycerin co-initiated polyether polyol having a hydroxyl number of about 260, and an average functionality of about 7.0] | |
| CROSS-LINKING AGENT A | 23.00 |
| [diethylene glycol] | |
| REACTIVE DILUENT A | 9.98 |
| [propylene carbonate] | |
| FILLER C | 24.00 |
| [aluminum tri-hydrate] | |
| OTHER ADDITIVES | 3.50 |
| Second layer Polyisocyanate Component (B)(I) | |
| ISOCYANATE B | 94.50 |
| [a polymeric diphenylmethane diisocyanate (PMDI)] | |

The barrier-layer (C) composition of the composite structure is prepared by adding and reacting the following parts, by weight, unless otherwise indicated.

| Barrier-layer (C) Reactant | Amount (parts by weight) |
|---|---|
| Barrier-layer Resin Component (C)(II) | |
| POLYOL A | 18.00 |
| [a trimethylolpropane initiated polyether polyol having a hydroxyl number of about 35, and an average functionality of about 2.5] | |
| POLYOL C | 27.43 |
| [a vicinal toluenediamine-initiated polyether polyol having a hydroxyl number of about 390, and an average functionality of about 4.0] | |
| CROSS-LINKING AGENT A | 18.00 |
| [diethylene glycol] | |
| REACTIVE DILUENT A | 7.00 |
| [propylene carbonate] | |
| FILLER C | 23.00 |
| [aluminum tri-hydrate] | |
| CATALYST C | 0.05 |
| [Formez ul-28] | |
| CROSS-LINKING AGENT B | 3.00 |
| [diethyltoluenediamine] | |
| OTHER ADDITIVES | 3.52 |
| Barrier-layer Polyisocyanate Component (C)(I) | |
| ISOCYANATE B | 94.50 |
| [a polymeric diphenylmethane diisocyanate (PMDI)] | |

To make the composite structure, the first layer (A) is first applied to a mold substrate. Prior to application of the first layer (A), it is preferred that a mold-release agent is applied to the mold substrate, and it is also preferred that the mold substrate is tempered to a temperature ranging from 75° F. to 125° F. The first layer (A) is spray applied to the mold substrate to a thickness from 1 to 500 mils. Furthermore, the first layer (A) has a gel time ranging from 1 to 60 seconds and exhibits a Shore D hardness of at least 65.

Next, the barrier-layer (C) is applied to the first layer (A). More specifically, the barrier layer (C) is spray applied to a thickness of from 1 to 1000 mils. The barrier layer (C) has a gel time ranging from 1 second to 2 minutes. Next, the second layer (B) is applied to the barrier-layer (C) to establish the complete composite structure. The second layer (B) is sprayed to a thickness from 1 to 2000 mils and has a gel time ranging from 1 to 15 minutes. The completed composite structure is de-molded from the mold substrate by any suitable method.

The complete composite structure exhibited good physical properties, including a flexural modulus of at least 200,000 lb/in$^2$.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

We claim:

1. A composite structure comprising:
   (A) a first-layer substantially free of volatile organic compounds, said first-layer comprising the reaction product of;
      (I) a first-layer polyisocyanate component including an aliphatic polyisocyanate;
      (II) a first-layer resin component comprising a polyamine;
   wherein said first-layer is a show surface of the composite structure and has a Shore D hardness of at least 65; and
   (B) a second-layer substantially free of volatile organic compounds, said second-layer comprising the reaction product of;
      (I) a second-layer polyisocyanate component; and
      (II) a second-layer resin component comprising a polyol having a theoretical functionality of at least three;
   wherein the composite structure has a flexural modulus of at least 200,000 lb/in$^2$.

2. A composite structure as set forth in claim 1 wherein said first-layer (A) has a Shore D hardness of at least 80.

3. A composite structure as set forth in claim 1 wherein said first-layer (A) has a Shore D hardness from 80 to 90.

4. A composite structure as set forth in claim 1 made in an open-mold.

5. A composite structure as set forth in claim 1 wherein said a polyol is made from an initiator compound selected from the group consisting of glycerin, methyl glucoside, pentaerythritol, sorbitol, sucrose, toluenediamine, ethylenediamine, and mixtures thereof.

6. A composite structure as set forth in claim 1 wherein said polyol is made from an initiator compound comprising a mixture of sucrose and glycerin, said mixture having an average theoretical functionality of 7.

7. A composite structure as set forth in claim 1 wherein said polyol comprises a plurality of polyols having a hydroxyl number of 200 meq polyol/g KOH or more and a viscosity of 5,000 centipoise or less at 25° C.

8. A composite structure as set forth in claim 7 wherein said plurality of polyols comprises a first polyether polyol having a hydroxyl number of from 225 to 295 meq polyol/g KOH.

9. A composite structure as set forth in claim 8 wherein the viscosity of said first polyether polyol is from 2000 to 3200 centipoise at 25° C.

10. A composite structure as set forth in claim 8 wherein the number average molecular weight of said first polyether polyol is from 500 to 5,000.

11. A composite structure as set forth in claim 1 wherein the volume ratio of said second-layer polyisocyanate component (B)(I) to said second-layer resin component (B)(II) is from 1:3 to 3:1.

12. A composite structure as set forth in claim 1 wherein said polyol is present in an amount from 20 to 60 parts by weight based on 100 parts by weight of said second-layer resin component (B)(II).

13. A composite structure as set forth in claim 8 wherein said first polyether polyol is present in an amount from 10 to 30 parts by weight based on 100 parts by weight of said second-layer resin component (B)(II).

14. A composite structure as set forth in claim 1 wherein said second-layer resin component (B)(II) further comprises a supplemental cross-linking agent selected from the group consisting of diols.

15. A composite structure as set forth in claim 14 wherein said cross-linking agent is present in an amount from 10 to 30 parts by weight based on 100 parts by weight of said second-layer resin component (B)(II).

16. A composite structure as set forth in claim 1 wherein said second-layer resin component (B)(II) further includes propylene carbonate present in an amount from 1 to 15 parts by weight based on 100 parts by weight of said second-layer resin component (B)(II).

17. A composite structure as set forth in claim 1 wherein said second-layer resin component (B)(II) further includes at least one additive selected from the group consisting of surfactants, flame retardants, fillers, dyes, water scavengers, anti-foam agents, catalysts, UV performance enhancers, pigments, hindered amine light stabilizers, and mixtures thereof.

18. A composite structure as set forth in claim 1 wherein said second-layer polyisocyanate component (B)(I) comprises polymeric diphenylmethane diisocyanate.

19. A composite structure as set forth in claim 1 wherein said second-layer polyisocyanate component (B)(I) comprises a polymeric diphenylmethane diisocyanate initiated pre-polymer.

20. A composite structure as set forth in claim 1 wherein said polyamine of said first-layer resin component (A)(II) is an aliphatic polyamine.

21. A composite structure as set forth in claim 20 wherein said aliphatic polyisocyanate of said first-layer polyisocyanate component (A)(I) is selected from the group consisting of hexamethylene diisocyanate, isophorone diisocyanate, and mixtures thereof.

22. A composite structure as set forth in claim 20 wherein said aliphatic polyisocyanate of said first-layer polyisocyanate component (A)(I) comprises isophorone diisocyanate.

23. A composite structure as set forth in claim 21 wherein said first-layer polyisocyanate component (A)(I) further comprises a polymeric isophorone diisocyanate initiated pre-polymer.

24. A composite structure as set forth in claim 20 wherein said aliphatic polyamine is selected from the group consisting of polyoxyalkylene amines, polyoxyalkylene diamines, polyoxyalkylene triamines, and mixtures thereof.

25. A composite structure as set forth in claim 22 wherein said aliphatic polyamine is polyoxypropylene diamine, whereby said polyoxypropylene diamine reacts with said isophorone diisocyanate to form an aliphatic polyurea.

26. A composite structure as set forth in claim 1 wherein said first-layer (A) has a thickness of from 1 to 500 mils.

27. A composite structure as set forth in claim 1 wherein said second-layer (B) has a thickness of from 1 to 2000 mils.

28. A composite structure as set forth in claim 1 wherein the volume ratio of said first-layer polyisocyanate component (A)(I) to said first-layer resin component (A)(II) is from 1:3 to 3:1.

29. A composite structure as set forth in claim 1 wherein said second-layer (B) further comprises chopped fibers.

30. A composite structure as set forth in claim 29 wherein said chopped fibers are selected from the group consisting of chopped fiberglass, chopped carbon fibers, chopped wood fibers, chopped aramid fibers, chopped polymer fibers, and mixtures thereof.

31. A composite structure as set forth in claim 1 further comprising at least one structural reinforcement element.

32. A composite structure as set forth in claim 31 wherein said at least one structural reinforcement element is selected from the group consisting of wood, cardboard, foam, and combinations thereof, and is disposed adjacent said second layer (B).

33. A composite structure comprising:
(A) a first-layer substantially free of volatile organic compounds, said first-layer comprising a polyurea and at least one UV performance enhancing additive wherein said first-layer is a show surface of the composite structure and has a Shore D hardness of at least 65; and
(B) a second-layer substantially free of volatile organic compounds, said second-layer comprising the reaction product of;
  (I) a second-layer polyisocyanate component; and
  (II) a second-layer resin component comprising at least one polyol having a theoretical functionality of at least three;
wherein the composite structure has a flexural modulus of at least 200,000 lb/in$^2$.

34. A composite structure as set forth in claim 33 wherein said at least one polyol comprises a plurality of polyols including a first polyether polyol made from an initiator compound comprising a mixture of sucrose and glycerin, said mixture having an average theoretical functionality of 7 such that said first polyether polyol is a sucrose-glycerin co-initiated polyether polyol.

35. A composite structure as set forth in claim 34 wherein said first polyether polyol has a hydroxyl number of 200 meq polyol/g KOH or more and a viscosity of 5,000 centipoise or less at 25° C.

36. A composite structure as set forth in claim 33 wherein said second-layer resin component (B)(II) further comprises a supplemental cross-linking agent selected from the group consisting of diols.

37. A composite structure as set forth in claim 33 wherein said second-layer resin component (B)(II) further comprises propylene carbonate present in an amount from 1 to 15 parts by weight based on 100 parts by weight of said second-layer resin component (B)(II).

38. A composite structure as set forth in claim 33 wherein said second-layer resin component (B)(II) further comprises at least one additive selected from the group consisting of surfactants, flame retardants, fillers, dyes, water scavengers, anti-foam agents, catalysts, pigments, hindered amine light stabilizers, and mixtures thereof.

39. A composite structure as set forth in claim 33 wherein the volume ratio of said second-layer polyisocyanate component (B)(I) to said second-layer resin component (B)(II) is from 1:3 to 3:1.

40. A composite structure as set forth in claim 33 wherein said second-layer (B) further comprises chopped fibers selected from the group consisting of chopped fiberglass, chopped carbon fibers, chopped wood fibers, chopped aramid fibers, chopped polymer fibers, and mixtures thereof.

41. A composite structure as set forth in claim 33 further including a barrier-layer (C) disposed between said first (A) and second (B) layers, said barrier-layer (C) comprising the reaction product of a barrier-layer polyisocyanate component, and a barrier-layer resin component.

42. A composite structure comprising:
(A) a first-layer substantially free of volatile organic compounds, said first-layer comprising the reaction product of;
  (I) a first-layer polyisocyanate component including an aliphatic polyisocyanate;
  (II) a first-layer resin component including an isocyanate-reactive compound, said compound selected from the group consisting of aromatic polyamines, aliphatic polyamines, and mixtures thereof;
wherein said first-layer has a Shore D hardness of at least 65; and
(B) a second-layer substantially free of volatile organic compounds, said second-layer comprising the reaction product of;
  (I) a second-layer polyisocyanate component; and
  (II) a second-layer resin component comprising a plurality of polyols including a first polyether polyol, said first polyether polyol made from an initiator compound having at least three functional groups;
wherein said first polyether polyol of said plurality has a hydroxyl number of 200 meq polyol/g KOH or more and a viscosity of 5,000 centipoise or less at 25° C.

43. A composite structure comprising:
(A) a first-layer substantially free of volatile organic compounds, said first-layer comprising the reaction product of;
  (I) a first-layer polyisocyanate component including an aliphatic polyisocyanate;
  (II) a first-layer resin component comprising a polyamine; wherein said first-layer is a show surface of the composite structure and has a Shore D hardness of at least 65;
(B) a second-layer substantially free of volatile organic compounds, said second-layer comprising the reaction product of;
  (I) a Second-layer polyisocyanate component; and
  (II) a second-layer resin component comprising at least one polyol having a theorectical Ranctionality of at least three; and
(C) a barrier-layer (C) disposed between said first (A) and second (B) layers, said barrier-layer (C) comprising the reaction product of a barrier-layer polyisocyanate component, and a barrier-layer resin component; wherein the composite structure has a flexural modulus of at least 200,000 lb/in$^2$.

44. A composite structure as set forth in claim 43 wherein said barrier-layer resin component includes a blend of a trimethylol propane—initiated polyether polyol having a hydroxyl number of 30 meq polyol/g KOH or more and an average functionality of from 2 to 3, and a vicinal tolnenediamine-initiated polyether polyol having a hydroxyl number of 300 meq polyol/g KOH or more and an average functionality of from 3.5 to 4.5.

* * * * *